United States Patent [19]

Dennison et al.

[11] Patent Number: 4,636,014
[45] Date of Patent: Jan. 13, 1987

[54] MASTER TRACK CHAIN CONNECTION FOR CRAWLER TRACTORS

[75] Inventors: Thomas M. Dennison, Peoria; Blair A. Maust, Dunlap, both of Ill.

[73] Assignee: Caterpillar Inc., Peoria, Ill.

[21] Appl. No.: 812,676

[22] Filed: Dec. 23, 1985

[51] Int. Cl.⁴ .................................................. B62D 55/20
[52] U.S. Cl. ........................................ 305/54; 305/58 R
[58] Field of Search .................... 305/39, 54, 58 R, 51

[56] References Cited

U.S. PATENT DOCUMENTS

| | | | |
|---|---|---|---|
| 2,882,102 | 4/1959 | Rund | 305/10 |
| 3,020,096 | 2/1962 | Strnad | 305/58 R |
| 3,427,079 | 2/1969 | Skromme et al. | 305/58 R |
| 3,659,112 | 4/1972 | Stedman | 305/58 R |
| 3,853,360 | 12/1974 | Khuntia | 305/58 R |
| 4,050,750 | 9/1977 | Yoshihashi et al. | 305/54 |
| 4,058,351 | 11/1977 | Murphy | 305/54 |
| 4,105,260 | 8/1978 | Blunier et al. | 305/54 |
| 4,332,425 | 6/1982 | Baylor | 305/54 |
| 4,351,573 | 9/1982 | Bedis et al. | 305/54 |
| 4,361,364 | 11/1982 | Brunn | 305/58 R |
| 4,365,848 | 12/1982 | Grilli et al. | 305/58 R |
| 4,457,565 | 7/1984 | Bissi et al. | 305/58 R |

FOREIGN PATENT DOCUMENTS

| | | | |
|---|---|---|---|
| 675781 | 12/1963 | Canada | 305/54 |
| 0054879 | 6/1982 | European Pat. Off. . | |
| 0136601 | 4/1985 | European Pat. Off. . | |
| 2844107 | 4/1979 | Fed. Rep. of Germany . | |
| 3021325 | 1/1981 | Fed. Rep. of Germany . | |
| 1067020 | 6/1954 | France | 305/54 |
| 2209349 | 6/1974 | France . | |

*Primary Examiner*—David A. Scherbel
*Attorney, Agent, or Firm*—O. Gordon Pence

[57] ABSTRACT

A master track chain connection for use on track chains of crawler tractors is disclosed. The master connection includes apparatus for independently securing the track shoe to the split master link thereof and for retaining or clamping the half-links of the split master links together. Separating the track shoe retention function from the half-link clamping function maintains clamping integrity in the event of bolt-loosening as the result of load induced slippage of the track shoe relative the link. The apparatus includes a first bolt threaded into a first threaded aperture for solely fastening the track shoe to the link and a second bolt threaded into a second threaded aperture for solely retaining the half-links together. A third bolt is preferably provided for jointly securing the track shoe to the link and for clamping the half-links together.

8 Claims, 5 Drawing Figures

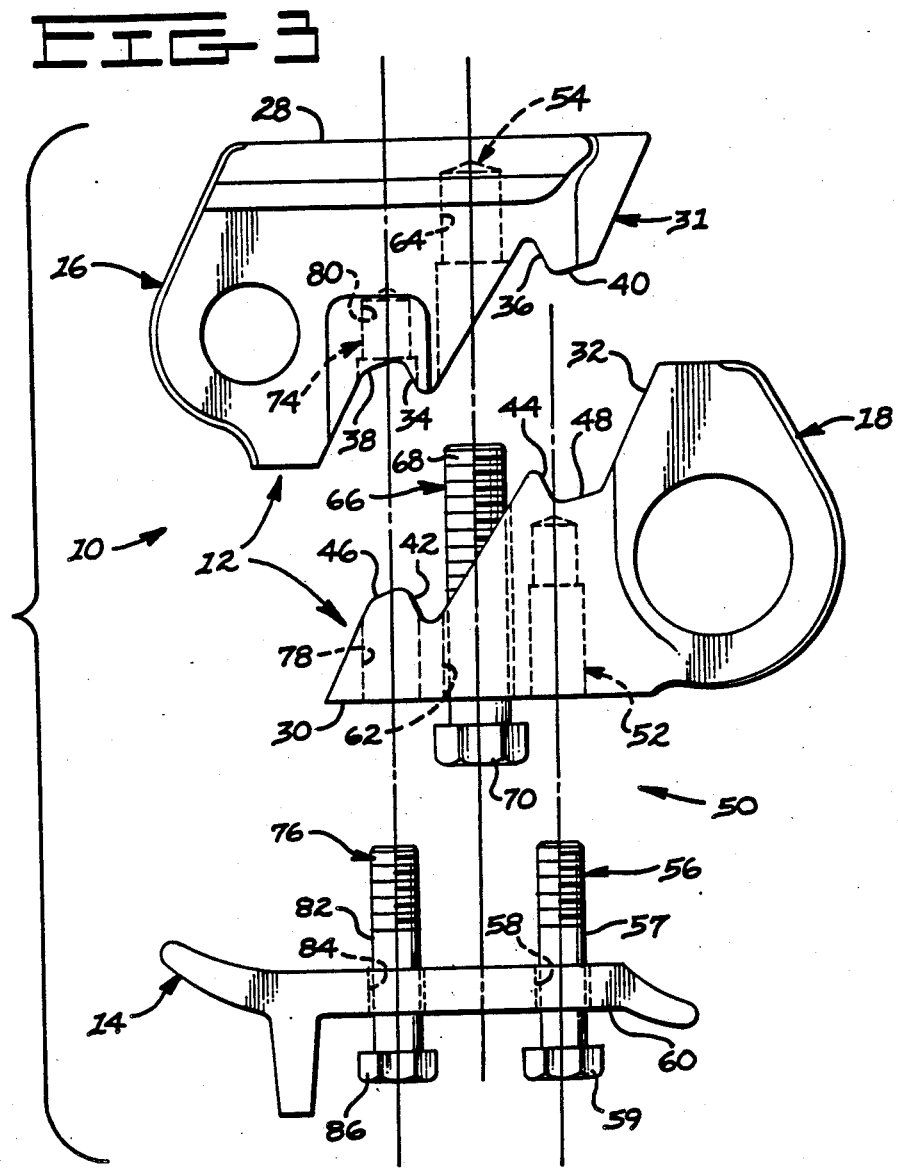

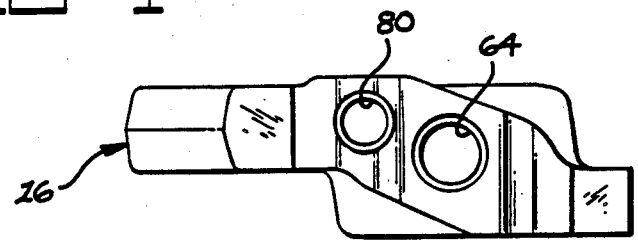
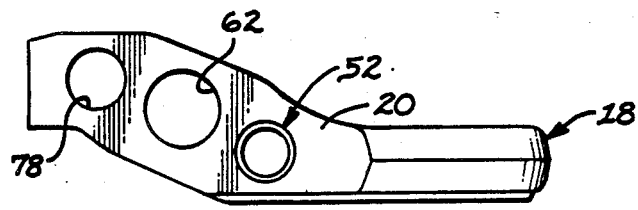

MASTER TRACK CHAIN CONNECTION FOR CRAWLER TRACTORS

DESCRIPTION

1. Technical Field

This invention relates generally to master track chain connections for crawler tractors and, more particularly, to an apparatus for securing a track shoe to a split master link and for retaining the half-links thereof together.

2. Background Art

Endless track chains for propelling crawler vehicles typically use a master connection for facilitating the breaking of the track to permit its removal for repair and servicing. In sealed and lubricated track, a split-type master link with two half-links is commonly used in order to permit the breaking of the track without disturbing any of the sealed joints of such track.

A typical split master link is disclosed in U.S. Pat. No. 3,427,079 for a "Two-Piece Master Track Link", issued Feb. 11, 1969 to A. G. Shromme et al. and assigned to the assignee hereof. Such two-piece master link includes two half-links which have a plurality of interlocking serrations. Such serrations are disposed along mating surfaces oriented in a generally diagonal direction. The two half-links are secured by a pair of bolts which are threaded into apertures entering through the mounting surface which receives a track shoe of the track. Such bolts are positioned through the track shoe in the same manner as regular, or non-master links, and are utilized to fasten the shoe to the link, as well as to retain the half-links together.

Tractive effort to propel and stop a crawler vehicle is transmitted between the track shoe and link to which it is mounted. The forces generated by such tractive effort is resisted solely by the clamping force exerted by the bolts retaining the shoes to the track links. Even though track shoe bolts are highly tightened in an effort to prevent slippage between the shoes and links, such slippage can occur due to improper bolt tightening or due to excessive loads on the track shoe. A limited amount of slippage is possible because the bolt holes in the track shoes are larger (oversize) than the bolts to accommodate manufacturing and assembly tolerances. As the weight and horsepower of crawler tractors have increased and the applications in which such tractors are used become more severe, the tendency of track shoe to link slippage has also increased. Due to irregularities in the mounting surfaces and the like, such slippage may result in bolt loosening.

Bolt loosening at the master link is particularly detrimental because it can cause looseness between the half-links of the split master link. When this occurs, the split master link may fail due to rapid wear, local yielding, fretting, and/or metal fatigue resulting from the impact between the interlocking teeth of such half-links.

Another problem associated with the use of the prior split master link is encountered during the assembly of the half-links and the track shoe to such half-links to effect the joining of the ends of the track chain. This assembly problem results from the necessity to achieve and maintain alignment between the bolt holes in the half-links of the split-master link, while placing the track shoe onto the link and aligning its bolt holes with the holes of the link and, then, inserting the retaining bolts through the shoe and threading them into the link to secure the shoe to the link and to clamp the half-links together.

U.S. Pat. No. 4,105,260 for a "Track Shoe and Bolt Retention Arrangement", issued Aug. 8, 1978 to Dennis L. Blunier et al., and also assigned to the assignee hereof, solves part of the problems by providing a key arrangement between the track shoe and the links so as to substantially reduce or eliminate shifting of the track shoe relative to the link.

The present invention is directed to overcoming one or more of the problems as set forth above.

DISCLOSURE OF THE INVENTION

In accordance with one aspect of the present invention, there is provided a master link for an endless track having a mounting surface along one edge thereof for receiving a track shoe, a rail surface along the opposite edge thereof, and a pair of half-links separable along mating interlocking surfaces. The interlocking surfaces are oriented in a generally diagonal direction between the mounting surface and the rail surface of the link. Means are provided for independently securing the track shoes to the master link and for retaining the half-links together. Such means includes at least a first and a second threaded aperture each entering through the track shoe mounting surface. The first of the threaded apertures is adapted to receive a first bolt for solely fastening the track shoe to the link. The second of the apertures is adapted to receive a second bolt for solely retaining the half-links of the master link together. The second bolt has a head positionable in abutting engagement against the mounting surface of the link and not against the track shoe.

In another aspect of the present invention, a master connection for an endless track chain is provided with a split master link having a mounting surface along one edge thereof, a rail surface along the opposite edge thereof, and a pair of half-links separable along mating interlocking surfaces. The surfaces are oriented in a generally diagonal direction between the mounting surface and the rail surface of the link. A track shoe is positioned along the mounting surface of said link and means are provided for independently securing the track shoe to the master link and for retaining the half-links together. The means includes a first bolt and a second bolt, each bolt having a head and a threaded shank, first and second apertures in the link, and first and second apertures through the shoe. The first shoe aperture is sized to receive the shank of the first bolt with the head of the first bolt being engaged against the track shoe and the threaded shank thereof threaded into the first threaded aperture in the link for solely fastening the track shoe to the link. The second of the shoe apertures is sized to provide clearance around the head of the second bolt. The second bolt is threadably engaged in the second threaded aperture of the link with its head in abutting engagement against the mounting surface of the link and not against the track shoe for solely retaining the half-links of the master link together.

BRIEF DESCRIPTION OF THE DRAWINGS

FIG. 3 illustrates an exploded side elevational view of an embodiment of the present invention;

FIG. 4 illustrates a bottom plan view of one of the half-links of the present invention; and FIG. 5 illustrates a bottom plan view of the other of the half-links of the present invention.

BEST MODE FOR CARRYING OUT THE INVENTION

Figure 1:
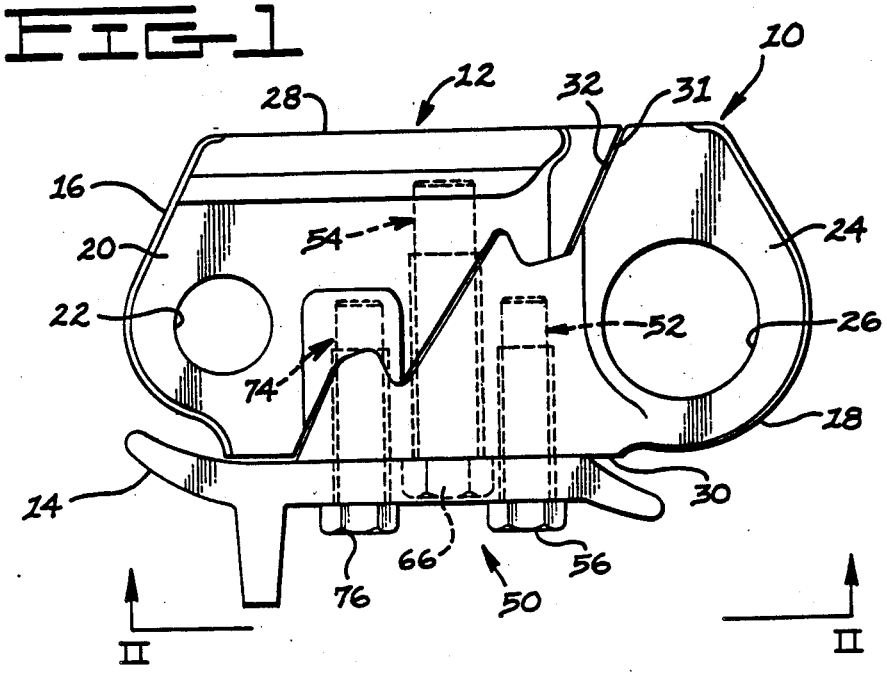
FIG. 1 illustrates a side elevational view of a master track chain connection embodying the principles of the present invention.

Referring now to the drawings, a preferred embodiment of a master track chain connection embodying the principles of the present invention is generally depicted at 10 in FIG. 1. Such master connection 10 includes a split master link 12 and a master track shoe 14 and is used for connecting the ends of a track chain (not shown) together to form the chain into an endless loop for supporting and propelling crawler vehicles, such as tractors, loaders, excavators and the like, also not shown.

Figure 2:
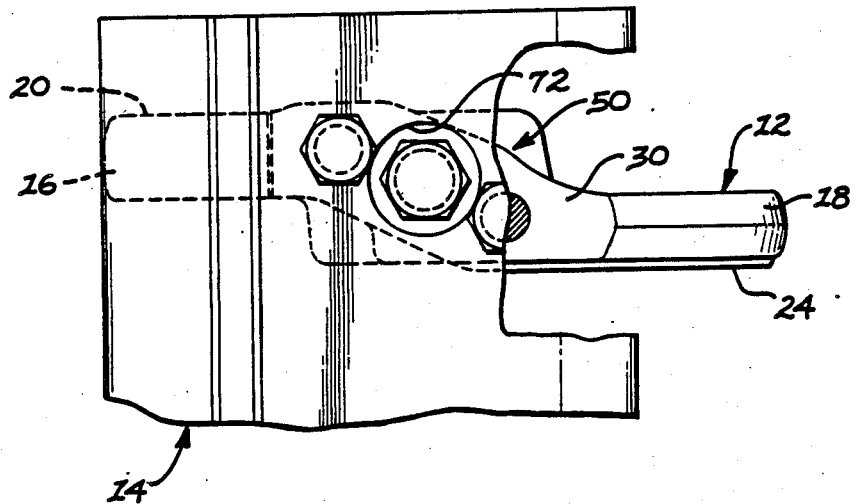
FIG. 2 illustrates a bottom view of the master chain connection of FIG. 1 with a portion of the track shoe shown thereof broken away.

The split master link 12 has a pair of half-links 16,18. Half-link 16 has an end portion 20 having a pin bore 22 for receiving a pin (not shown). Half-link 18 has an end portion 24 having a bushing bore 26 for receiving a bushing (not shown). As best shown in FIG. 2, end portions 20,24 are laterally offset from each other to permit overlapping with the respective end portions of adjoining links (not shown) of the track chain. As will be appreciated by those skilled in the art, the overlapping end portions of the links are articulately coupled together by respective pins and bushings of the track chain.

The master link 12 also includes a top rail surface 28 on which the rollers (not shown) of the tractor run and an opposite mounting surface 30 for receiving track shoe 14. In the embodiment shown, the rail surface 28 is provided on half-link 16 and mounting surface 30 is provided on half-link 18. As best seen in FIG. 3, the half-links 16,18 are joined together along mating interlocking surfaces 31,32, respectively, which are disposed in a generally diagonally oriented direction between the rail and mounting surfaces 28,30. Interlocking surface 31 of half-link 16 preferably has a pair of generally vertically inclined contact surfaces 34,36 and a pair of generally horizontally inclined contact surfaces 38,40. Interlocking surface 32 of half-link 18 likewise has a pair of generally vertically inclined contact surfaces 42,44 and a pair of generally horizontally inclined contact surfaces 46,48. When the half-links are fitted together, as shown in FIG. 1, the vertically inclined surfaces 34,36 of half-link 16 are in abutting engagement with the vertically inclined surfaces 42,44, respectively, of half-link 18 and the horizontally inclined surfaces 38,40 are in abutting engagement against their respective horizontally inclined surfaces 46,48. The abutting horizontally inclined surfaces 38,40 and 46,48 locate the half-links vertically relative to each other and primarily carry vertical loads therebetween. The abutting vertically inclined surfaces 34,36 and 42,44, on the other hand, locate the half-links in the horizontal direction and primarily carry horizontal loads therebetween.

In accordance with the present invention, apparatus or means 50 are provided for independently securing the track shoe 14 to the master link 12 and for retaining the half-links 16,18 together. Means 50 includes a first threaded aperture 52 and a second threaded aperture 54 in master link 12, each entering through mounting surface 30. The first threaded aperture 52 is preferably entirely within half-link 18 and is adapted to receive a first bolt 56 for solely fastening the track shoe 14 to the master link 12. Bolt 56 has a shank portion 57 which is received through a bolt hole in track shoe 14 and a head 59 engaging the outer surface 60 of the track shoe 14 to exert a clamping force thereon.

The second threaded aperture 54 has a through bore portion 62 in half-link 18 and a blind threaded portion 64 in half-link 16 which is aligned with the through portion 62 when the half-links are fitted together. The second threaded aperture 54 is adapted to receive a second bolt 66 for solely retaining the half-links together. To accomplish this, second bolt 66 has a shank portion 68 threadably received within the second threaded aperture 54 and a head 70 engaged against the mounting surface 30 of the master link 12. The track shoe 14 is provided with a clearance hole 72 (FIG. 2) therethrough around bolt head 70.

As shown in the drawings, means 50 also preferably includes a third threaded aperture 74 entering through the mounting surface 30 of the master link 12. The third aperture 74 is adapted for receiving a third bolt 76 for jointly fastening the track shoe 14 to the link 12 and securing the half-links 16,18 together. The third aperture 74 includes a through bore portion 78 through half-link 18 and a blind threaded portion 80 in half-link 16. Third bolt 76 has a shank portion 82 which is received through a third bolt hole 84 in the track shoe 14 into the third threaded aperture 74 and a head 86 which engages the outer surface 60 of the track shoe 14 for clamping the track shoe 14 to the link.

Industrial Applicability

The master connection 10 of the present invention is generally applicable for joining the ends of any track chain, but is particularly useful in severe applications where high loads are applied to such master connection. Such high loads can cause slippage between the track shoe and the master link to which it is mounted. Such slippage is possible because the bolts holes in the track shoe through which the mounting bolts pass are somewhat oversize to accommodate manufacturing and assembly tolerances and permit their alignment with their respective holes in the link. Because of surface irregularities and the like, such slippage can result in the bolts becoming loose. This, in turn, can cause looseness between the half-links of the master link.

In the present master connection 10, clamping integrity is maintained between the half-links 16,18 even if such slippage occurs. This is accomplished by the securing and retaining means 50 which, in one respect, separates the function of retaining the track shoe 14 to the master link 12 from the function of securing or clamping the half-links 16,18 together and, in another respect, provides an overlap of such functions. In this regard, first bolt 56 is used solely for securing the track shoe 14 to the link 12. The second bolt 66, on the other hand, is used solely for clamping the half-links 16,18 together and is not affected in any way by the first bolt 56. The third bolt 76 is used both for securing the track shoe 14 to the link 12 and for clamping the half-links 16,18 together.

Means 50 also makes it possible to join and secure the half-links 16,18 prior to the mounting of the shoe 14 to the link 12. This eliminates the problem of simultaneously fitting the half-links 16,18 together and aligning the bolt holes in the shoe with the holes in the link. In this regard, the half-links 16,18 can be initially fitted together and securely clamped by means of the second bolt 66. Then, the track shoe 14 can be placed on the link 12 and secured thereto by means of the first bolt 56 and the third bolt 76.

Means 50 also advantageously enables the removal of the master shoe 14 without unclamping the half-links 16,18. This is easily accomplished by the removal of bolts 56 and 76 which permits the removal of the track shoe 14, while bolt 66 remains to keep the half-links clamped together. Thus, a worn or broken shoe can easily be replaced without disturbing the half-links.

In use, loads on the track shoe 14 which cause the shoe to slip will have no adverse affect on the second bolt 66 and such bolt's clamping of the half-links. As a consequence, no looseness will occur between the half-links, thereby eliminating any possible wear or impact between the mating interlocking surfaces of the half-links due to such looseness.

Other aspects, objects, and advantages of this invention can be obtained from a study of the drawings, the disclosure, and the appended claims.

We claim:

1. A master link for an endless track, comprising:
   said master link having a mounting surface along one edge thereof for receiving a track shoe, a rail surface along the opposite edge thereof, and a pair of half-links separable along mating interlocking surfaces, said surfaces being oriented in a generally diagonal direction between the mounting surface and the rail surface of the link; and
   means for independently securing the track shoe to the master link and for retaining said half-links together, said means including at least a first threaded aperture and a second threaded aperture each entering through said track shoe mounting surface, the first of said threaded apertures being adapted to receive a first bolt for solely fastening the track shoe to the link and the second of said apertures being adapted to receive a second bolt for solely retaining the half-links of the master link together, said second bolt having a head positionable in abutting engagement against the mounting surface of the link and not against the track shoe when said track shoe is positioned on said master link.

2. The master link of claim 1 wherein said first threaded aperture is contained entirely within one of said half-links and said second threaded aperture includes a through bore portion within said one half-link and a blind threaded portion in the other of said half-links and aligned with said through bore portion.

3. The master link of claim 2 wherein said track shoe has a clearance aperture therethrough located around the head of said second bolt.

4. The master link of claim 1 wherein said link has a third threaded aperture entering through said mounting surface, said third aperture being adapted for receiving a third bolt for jointly fastening said track shoe to the link and securing said half-links together.

5. The master link of claim 4 wherein said second aperture is disposed intermediate said first and third apertures.

6. In a master connection for an endless track chain, the combination comprising:
   a split master link having a mounting surface along one edge thereof, a rail surface along the opposite edge thereof, and a pair of half-links separable along mating interlocking surfaces, said interlocking surfaces being oriented in a generally diagonal direction between the mounting surface and the rail surface of the link;
   a track shoe positioned along said mounting surface of said link; and
   means for independently securing the track shoe to the master link and for retaining said half-links together, said means including a first bolt and a second bolt, each bolt having a head and a threaded shank, first and second apertures in said link, and first and second apertures through said shoe, said first shoe aperture being sized to receive the shank of the first bolt with the head of said first bolt engaged against said track shoe and the threaded shank thereof threaded into said first threaded aperture in the link for solely fastening the track shoe to the link and the second of said shoe apertures being sized to provide clearance around the head of said second bolt, said second bolt being threadably engaged in said second threaded aperture of the link with its head in abutting engagement against the mounting surface of the link and not against the track shoe for solely retaining the half-links of the master link together.

7. The master connection of claim 6 wherein said first threaded aperture is contained entirely within one of said half-links and said second threaded aperture includes a through bore portion within said one half-link and a blind threaded portion in the other of said half-links and aligned with said through bore portion.

8. The master connection of claim 7 wherein said link has a third threaded aperture entering through said mounting surface, said third aperture being adapted for receiving a third bolt for jointly fastening said track shoe to the link and securing said half-links together.

* * * * *